Patented July 6, 1954

2,683,174

UNITED STATES PATENT OFFICE 2,683,174

OXIDATION OF ISOBUTYLENE TO PRODUCE KETONES, ALDEHYDES, AND ALCOHOLS

Armand J. De Rosset, Clarendon Hills, Ill., assignor to Universal Oil Products Company, Chicago, Ill., a corporation of Delaware No Drawing. Application September 9, 1949, Serial No. 114,906

6 Claims. (Cl. 260—597)

This invention relates to a process for oxidizing isobutylene to form oxygen-containing organic compounds and particularly to form normally liquid oxygen-containing compounds comprising aldehydes, ketones, and alcohols.

An object of this invention is to convert isobutylene into more useful organic compounds.

Another object of this invention is to convert isobutylene into normally liquid oxygen-containing compounds comprising aldehydes, ketones, and alcohols.

One specific embodiment of this invention relates to a process which comprises reacting isobutylyene and oxygen at a temperature above about 180° C. and at a pressure above about 30 atmospheres for a time of from about 0.5 to about 60 seconds to form a reaction product, subjecting said product to separation treatment and recovering aldehydes, ketones and alcohols therefrom.

Another embodiment of this invention relates to a process which comprises reacting from about 2.5 to about 20 molecular proportions of isobutylene and one molecular proportion of oxygen at a temperature of from about 180° to about 300° C. and at a pressure of from about 30 to about 150 atmospheres for a time of from about 0.5 to about 60 seconds to form a reaction product, subjecting said product to separation treatment and recovering aldehydes, ketones and alcohols therefrom.

Heretofore isobutylene was reacted with oxygen in batch-wise treatment at atmospheric pressure so as to convert all of the oxygen into carbon oxides and formaldehyde but no liquid oxygenated products were obtained. Also in studying gum formation in gasoline, olefines were exposed to the action of air at ordinary temperature and pressure for a relatively long time during which a small amount of higher boiling oxygenated liquids was obtained. These earlier methods of oxidizing isobutylene are entirely different from that of the present process in which isobutylene reacts with approximately an equimolecular proportion of oxygen to form about 2.7 grams of liquid product per gram of oxygen consumed.

Optimum conditions for oxidation of isobutylene to form high yields of normally liquid oxygen-containing organic compounds are different from those required in the oxidation of other olefins. For example, I found that ethylene did not react smoothly with oxgen at conditions employed for oxidizing isobutylene.

An essential feature of my invention is the use of specific conditions of operation which are required to give efficient oxidation of isobutylene. By efficient oxidation of isobutylene, is meant a reaction which proceeds smoothly without temperature or pressure surges or hazardous detonation and in which all oxygen is consumed and at a minimum amount preferably less than 15% converted to carbon oxides and water.

The operating temperature used with such a mixture of oxygen and isobutylene must be at least 180° C. as otherwise the oxidation reaction will not be self-sustaining and will display surges of temperature and pressure. The operating temperature is generally from about 180° to about 300° C. and the operating pressure is from about 30 to about 150 atmospheres although pressures of from about 60 to about 100 atmospheres are preferred. Also the preferred operating temperature is from about 200° to about 250° C. when employing a reaction time of from about 10 to about 30 seconds.

The isobutylene to oxygen ratio used is from about 2.5 to 1 to about 20 to 1. At the lower isobutylene to oxygen ratios, excessive temperatures are encountered which affect product quality, are destructive to equipment and involve hazards of explosions and fire. At too high values of the ratio (above 20 to 1), self-sustaining reactions are not obtained.

The oxidation reaction of this process is carried out preferably in an unpacked reaction vessel with a small surface/volume ratio. It is of interest that by using a small spherical reaction vessel with surface-volume ratio of 1.2 cm.$^{-1}$ 85% of the charged oxygen was converted into organic liquids, while a cylindrical reactor with a surface/volume ratio of 2.7 cm.$^{-1}$ gave less satisfactory results, that is, gave a yield of less than 70% of oxygen-containing organic liquid.

The reaction time or what may be referred to as the residence time of the oxygen-hydrocarbon mixture at the reaction temperature is from about 0.5 to about 60 seconds, but a reaction time of from about 10 to about 30 seconds is generally preferred in order to obtain a high yield of liquid organic compounds with only small formations of water, carbon monoxide, and carbon dioxide.

The oxidizing gas employed in the process may be pure oxygen or it may be a mixture of oxygen and an inert diluent as carbon dioxide, nitrogen, and the like.

For a given ratio of isobutylene to oxygen, a decrease in the oxygen content of the oxidizing gas tends to increase the degree of oxidation of the product evidenced by higher density of the product and higher acidity. The yield of liquid product per weight of oxygen fed is accordingly lower.

Within the limits imposed by variations in reaction conditions as noted above, isobutylene and oxygen react in substantially equimolecular proportions. The yield of liquid product was approximately 2.7 grams per gram of oxygen consumed (or per gram of oxygen fed since consumption was complete). Diluting the oxidizing gas with nitrogen reduced the yield to as low as 1.7 grams per gram of oxygen consumed (for 10% oxygen in oxidizing feed).

The identification of some of the isobutylene oxidation products and absence of other expected products from the reaction mixture suggest the following course of the reaction although these concepts should not be misconstrued to limit unduly the generally broad scope of the invention.

Acetone is the most abundant single product. By infrared analysis it accounts for approximately 17% of the total reaction product. Acetone would form by oxidative cleavage of the double bond, together with formaldehyde. Significant amounts of formaldehyde did not appear in the product or in the gas overhead. Hence, formaldehyde, or an activated form of it, must have reacted rapidly with acetone or other oxidation products to give higher molecular weight material. For example:

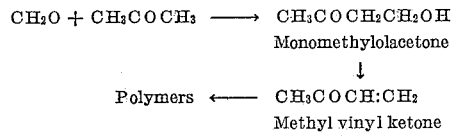

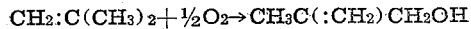

Tentative identification of methallyl alcohol indicated possibility of a noncleavage oxidation of a primary carbon atom $$CH_2:C(CH_3)_2 + \tfrac{1}{2}O_2 \rightarrow CH_3C(:CH_2)CH_2OH$$

Presence of t-butyl alcohol (and higher tertiary acohols) as well as $C_5+$ olefins suggests non-oxidative reactions, as olefin hydration and polymerization. In this connection, the absence of the ordinary $C_1$-$C_4$ primary alcohols is notable.

In this process, the principal single product is acetone—about 17%. Other products are saturated (and possibly unsaturated) aldehydes and ketones, olefins, and high molecular weight condensation products. Tertiary (and possibly unsaturated) alcohols are present, but simple primary alcohols are absent. Formaldehyde is absent.

Exhaustive hydrogenation or oxidation to give either alcohols or acids respectively is a possible way of simplifying the products mixture by chemical means.

The nature of the present invention and type of results obtained are illustrated further by the following example although these data should not be misconstrued to limit unduly the generally broad scope of the invention.

EXAMPLE

Continuous oxidation of isobutylene with molecular oxygen was carried out in the vapor phase in a spherical reaction zone of 70 cc. capacity hollowed out of a steel cube. Into each face of the cube was drilled a threaded port extending into the reaction zone. Into each of said ports was screwed a plug or fitting whereby preheated reactants were introduced into the reaction zone, thermocouple wells and pressure taps inserted into the reaction zone, and products withdrawn from the reaction zone. One plug was equipped with a glow coil, which could be heated to incandescence by an electric current, and which provided a means for initialing oxidation reaction.

Reactants were preheated in an externally electrically heated cylindrical bronze preheater block which screwed into the top port of the reactor. The cylindrical block was drilled longitudinally to admit two preheater spirals. Two metered streams of feed, one an oxygen containing gas, the other isobutylene, were separately preheated in the preheater block, and mixed in a mixing zone at the base of the preheater, where it fitted into the reactor.

Products of oxidation were withdrawn through a valve at the bottom of the reactor. This location of the exit valve prevented accumulation of liquid product in the reaction zone.

Pressure on the reactor was controlled by adjusting the exit valve. Temperature in the reaction zone was controlled by adjusting the temperature of the preheater block.

Effluent stream was liquified by cooling in a carbon dioxide-acetone cooled condenser, and the cold liquid product was fed to a stripping column operated with isobutylene reflux. Isobutylene oxidation product was withdrawn from the bottom of the stripping tower. Unconverted isobutylene and uncondensed gases were recovered in the overhead gas stream, metered, and analyzed.

The above indicated apparatus and collecting system were used in three runs made at a pressure of 70–80 atmospheres on a mixture of 5–7 molecular proportions of isobutylene and one molecular proportion of oxygen, as indicated in the table. In one case, nitrogen was added to the oxidizing stream to give a concentration in this stream of 63% oxygen.

*Table*

OXIDATION OF ISOBUTYLENE

| Run No. | 1 | 2 | 3 |
|---|---|---|---|
| Press., Atm. | 79 | 77 | 84 |
| Temp., °C.: | | | |
| Preheat | 226 | 206 | 227 |
| Reactor | 197 | 183 | 202 |
| Reaction | 237 | 217 | 243 |
| Feed Rates: | | | |
| i-$C_4H_8$, Mols./Hr. | 13.6 | 13.1 | 22.4 |
| $O_2$, Mols./Hr. | 2.7 | 2.43 | 3.1 |
| $N_2$, Mols./Hr. | 0 | 0 | 1.5 |
| GHSV, v./v.-Hr. | 5,300 | 5,100 | 8,800 |
| Res. Time, Sec. | 29 | 32 | 18 |
| Material Balance, Charge, Gms.: | | | |
| i-$C_4H_8$ | 787 | 1,433 | 1,635 |
| $O_2$ | 89 | 151 | 129 |
| $N_2$ | 0 | 0 | 57 |
| Total | 876 | 1,584 | 1,821 |
| Recovery, Gms.: | | | |
| $N_2$ | 0 | 0 | 57 |
| CO | 5 | 25 | 11 |
| $CO_2$ | 7 | 7 | 11 |
| $H_2$ | 0 | 1 | trace |
| $CH_4$ | 0 | 4 | 1 |
| $C_2H_4$—$C_2H_6$ | 1 | 5 | 0 |
| $C_3H_6$—$C_3H_8$ | 0 | 1 | trace |
| i-$C_4H_8$ | 566 | 986 | 1,349 |
| $H_2O$ | 2 | 2 | 5 |
| Liquid, 20°–105° C. | 72 | 163 | 136 |
| Liquid, 105° C.+ | 169 | 263 | 209 |
| Total | 822 | 1,457 | 1,779 |
| Loss | 54 | 127 | 42 |
| Recovery, Percent | 94 | 92 | 98 |
| Assumed Loss Dist.: | | | |
| i-$C_4H_8$, Gms. | 54 | 127 | 42 |
| $N_2$, gms. | 0 | 0 | 0 |
| Yield, Gms., Debut., Liquid/Gm. $O_2$ Fed | 2.73 | 2.84 | 2.72 |
| Reaction Ratio, Molar, i-$C_4H_8$/$O_2$ | 1.07 | 1.21 | 1.08 |
| Oxygen Dist. Percent— | | | |
| to CO | 3.3 | 9.3 | 4.7 |
| to $CO_2$ | 6.0 | 3.3 | 6.0 |
| to $H_2O$ | 2.1 | 2.0 | 4.0 |
| to Liquid (Dry) | 88.6 | 85.4 | 85.3 |
| Percent liquid boiling below 105° C. | 30.0 | 37.3 | 39.8 |

It will be noted that the lowest preheat temperature employed was 206° C. In other experiments, it was found possible to decrease to 173° C. the preheat temperature required for efficient reaction, by decreasing the molecular proportion of isobutylene to oxygen to 2.5. Further decrease in preheat temperature gave delayed explosive ignition, and resulted in formation of soot. Further decrease in molecular proportion of isobutylene to oxygen resulted in undesirable temperature rise.

It will be noted that yield of liquid product was 2.7 grams per gram of oxygen fed, which is close to the stoichiometric yield required for reaction of 1 mole of oxygen with one mole of isobutylene. The portion of oxygen fed which appeared as carbon oxides and water was less than 15% in all cases.

The product from oxidation of isobutylene according to the cited examples was separated into four fractions, as follows:

40% volatile material (to 130° C.)
29% high boiling material, insoluble in 4% sodium hydroxide
3% non-volatile material, insoluble in dilute phosphoric acid
18% non-volatile material, water soluble, ether insoluble.

The following compounds were found in the volatile fraction:

| Compound | Method of identification | Percent of total product |
|---|---|---|
| Acetaldehyde | boiling point, positive fuchsin test. | 0.1 |
| Acetone | infra red absorption | 17.0 |
| $C_3$-$C_4$-$C_5$ aldehydes | boiling point, positive fuchsin test, melting point of dinitrophenyl hydrazine derivative. | 2.7 |
| Isobutyl alcohol | infrared absorption | 1.7 |
| Allyl alcohol | do | 0.3 |
| Methallyl alcohol | boiling point, refractive index, density, rearrangement to isobutyraldehyde with HCl. | 3.4 |
| Methyl-isopropyl ketone | boiling point, negative fuchsin test, melting point of dinitrophenyl hydrazine derivative. | 5.0 |

Remainder of the volatile material consisted of olefins, unidentified ketones, and a small amount of water.

The high boiling alkali insoluble material showed, by infrared absorption analysis, presence of olefins, alcohols, aldehydes, and ketones. This material was readily polymerizable and its use is indicated as intermediate in preparation of resins and drying oils.

The non-volatile, acid insoluble material consisted of high molecular weight organic acids, likewise useful for preparation of modification of drying oils.

The non-volatile, water soluble, ether insoluble material consisted of glycols, hydroxy aldehydes, and hydroxy ketones. Its use is indicated as a freezing point depressant for aqueous coolant mixtures.

I claim as my invention:

1. In the vapor phase noncatalytic oxidation of isobutylene with molecular oxygen wherein the reactants are preheated to provide sufficient heat to maintain oxidation, and wherein reaction is initiated by external means, the method of substantially eliminating the formation of carbon oxides which comprises reacting isobutylene and substantially all of the oxygen mixed therewith at a temperature from about 180° to about 300° C. and at a pressure of from about 30 to about 150 atmospheres for a time of from about 0.5 to about 60 seconds, subjecting the resultant product to separation treatment, and recovering aldehydes, ketones, and alcohols therefrom.

2. In the vapor phase noncatalytic oxidation of isobutylene with molecular oxygen wherein the reactants are preheated to provide sufficient heat to maintain oxidation and wherein reaction is initiated by external means, the method of substantially eliminating the formation of carbon oxides which comprises reacting from about 2.5 to about 20 molecular proportions of isobutylene and one molecular proportion of oxygen at a temperature of from about 180° to about 300° C. and at a pressure from about 30 to about 150 atmospheres for a time of from about 0.5 to about 60 seconds, subjecting the resultant product to separation treatment, and recovering aldehydes, ketones, and alcohols therefrom.

3. In the vapor phase noncatalytic oxidation of isobutylene with molecular oxygen wherein the reactants are preheated to provide sufficient heat to maintain oxidation, and wherein reaction is initiated by external means, the method of substantially eliminating the formation of carbon oxides which comprises reacting from about 2.5 to about 20 molecular proportions of isobutylene and one molecular proportion of oxygen present in admixture with from about 1.5 to about 10 molecular proportions of an inert gaseous diluent at a temperature of from about 180° to about 300° C. and at a pressure from about 30 to about 150 atmospheres for a time of from about 0.5 to about 60 seconds, subjecting the resultant product to separation treatment, and recovering aldehydes, ketones, and alcohols therefrom.

4. In the vapor phase noncatalytic oxidation of isobutylene with molecular oxygen wherein the reactants are preheated to provide sufficient heat to maintain the oxidation, and wherein reaction is initiated by external means, the method of substantially eliminating the formation of carbon dioxides which comprises reacting from about 2.5 to about 20 molecular proportions of isobutylene and one molecular proportion of oxygen present in admixture with from about 1.5 to about 10 molecular proportions of nitrogen at a temperature of from about 180° to about 300° C. and at a pressure of from about 30 to about 150 atmospheres for a time of from about 0.5 to about 60 seconds, subjecting the resultant product to separation treatment, and recovering aldehydes, ketones, and alcohols therefrom.

5. In the vapor phase noncatalytic oxidation of isobutylene with molecular oxygen wherein the reactants are preheated to provide sufficient heat to maintain oxidation, and wherein reaction is initiated by external means, the method of substantially eliminating the formation of carbon oxides which comprises reacting from about 2.5 to about 20 molecular proportions of isobutylene and one molecular proportion of oxygen at a temperature of from about 200 to about 250° C. and at a pressure of from about 30 to about 150 atmospheres for a time of from about 10 to about 30 seconds, subjecting the resultant product to separation treatment, and recovering aldehydes, ketones, and alcohols therefrom.

6. In the vapor phase noncatalytic oxidation of isobutylene with molecular oxygen wherein the reactants are preheated to provide sufficient heat to maintain oxidation, and wherein reaction is initiated by external means, the method of substantially eliminating the formation of carbon oxides which comprises reacting from about 2.5 to about 20 molecular proportions of isobutylene and one molecular proportion of oxygen at a temperature of from about 200° to about 250° C. and at a pressure of from about 60 to about 100 atmospheres for a time of from about 10 to about 30 seconds, subjecting the resultant product to separation treatment, and recovering aldehydes, ketones, and alcohols therefrom.

References Cited in the file of this patent

UNITED STATES PATENTS

| Number | Name | Date |
|---|---|---|
| 2,369,182 | Rust et al. | Feb. 13, 1945 |
| 2,383,711 | Clark et al. | Aug. 28, 1945 |
| 2,451,485 | Hearne et al. | Oct. 19, 1948 |
| 2,475,605 | Prutton et al. | July 12, 1949 |

OTHER REFERENCES

Groggins: "Unit Processes in Organic Synthesis," 3rd edition, pages 465–469. Copyright 1947 by McGraw-Hill Book Company, New York.